(12) United States Patent
Cook

(10) Patent No.: US 9,025,256 B2
(45) Date of Patent: May 5, 2015

(54) DUAL FIELD OF VIEW REFRACTIVE OPTICAL SYSTEM FOR GEO SYNCHRONOUS EARTH ORBIT

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/044,659

(22) Filed: Mar. 10, 2011

(65) Prior Publication Data
US 2012/0229914 A1    Sep. 13, 2012

(51) Int. Cl.
  G02B 15/14    (2006.01)
  G02B 13/14    (2006.01)
  G02B 15/17    (2006.01)

(52) U.S. Cl.
  CPC ............... G02B 13/14 (2013.01); G02B 15/17 (2013.01)

(58) Field of Classification Search
  CPC .. G02B 13/143; G02B 13/18; G02B 13/0035; G02B 15/173; G02B 15/177; G02B 7/102; G02B 9/60
  USPC ......... 359/355, 689, 694, 684, 716, 784, 763, 359/676, 680–682; 250/353, 339.03, 216
  See application file for complete search history.

(56) References Cited

U.S. PATENT DOCUMENTS

| | | | |
|---|---|---|---|
| 4,507,551 A | | 3/1985 | Howard et al. |
| 4,679,891 A | * | 7/1987 | Roberts ........................... 359/357 |
| 5,692,062 A | * | 11/1997 | Lareau et al. .................. 382/107 |
| 5,742,251 A | | 4/1998 | Gerber |
| 5,742,254 A | * | 4/1998 | Bassaler ................ 343/700 MS |
| 5,940,224 A | | 8/1999 | Zhang |
| 6,091,551 A | * | 7/2000 | Watanabe ...................... 359/676 |
| 6,130,705 A | * | 10/2000 | Lareau et al. .................. 348/144 |
| 6,424,460 B1 | * | 7/2002 | Kirkham ........................ 359/353 |
| 6,781,127 B1 | | 8/2004 | Wolff et al. |

(Continued)

FOREIGN PATENT DOCUMENTS

| | | |
|---|---|---|
| EP | 490510 A2 | 6/1992 |
| EP | 1355180 A2 | 10/2003 |

(Continued)

OTHER PUBLICATIONS

Potter, Ned, Hobbyist Shoots Earth From Edge of Space With Used Camera From Ebay, Mar. 26, 2010. http://abcnews.go.com/Technology/balloon-camera-duct-tape-shoot-earth-pictures-space/story?id=10210658.*

(Continued)

*Primary Examiner* — Thomas K Pham
*Assistant Examiner* — Jie Lei
(74) *Attorney, Agent, or Firm* — Lando & Anastasi, LLP

(57) ABSTRACT

Various embodiments provide an optical system including a first lens group having a plurality of lenses; a second lens group having a plurality of lenses, the second lens group being disposed adjacent the first lens group; a third lens group having a plurality of lenses, the third lens group being disposed adjacent the second lens group; and a detector disposed behind the third lens group. A pupil of the optical system is located external to the first lens group, the second lens group and the third lens group. The second lens group is movable respective to the first lens group and the third lens group so as to convert a configuration of the optical system between a narrow field of view (NFOV) configuration and a wide field of view (WFOV) configuration.

17 Claims, 2 Drawing Sheets

(56) References Cited

U.S. PATENT DOCUMENTS

| | | | |
|---|---|---|---|
| 6,989,537 B2 | 1/2006 | Cook | |
| 7,012,759 B2* | 3/2006 | Betensky et al. | 359/676 |
| 7,092,150 B1* | 8/2006 | Cox | 359/356 |
| 7,138,619 B1 | 11/2006 | Ferrante et al. | |
| 7,218,444 B2 | 5/2007 | Cook | |
| RE40,582 E * | 11/2008 | Ishii et al. | 359/687 |
| 8,294,988 B2 | 10/2012 | Cook | |
| 2004/0169933 A1* | 9/2004 | Toyama | 359/686 |
| 2005/0243411 A1* | 11/2005 | Cook | 359/363 |
| 2005/0259330 A1* | 11/2005 | Neil | 359/676 |
| 2007/0023663 A1 | 2/2007 | Chen et al. | |
| 2008/0106798 A1* | 5/2008 | Sato | 359/687 |
| 2009/0109546 A1* | 4/2009 | Watanabe et al. | 359/687 |
| 2009/0168193 A1* | 7/2009 | Suzaki et al. | 359/684 |
| 2009/0212219 A1 | 8/2009 | Cook | |
| 2009/0316277 A1* | 12/2009 | Ichikawa | 359/687 |
| 2010/0033578 A1* | 2/2010 | Forestier et al. | 348/164 |
| 2010/0177195 A1 | 7/2010 | Colentier et al. | |
| 2011/0279681 A1 | 11/2011 | Cabib et al. | |
| 2012/0176668 A1 | 7/2012 | Saito et al. | |

FOREIGN PATENT DOCUMENTS

| | | | |
|---|---|---|---|
| JP | 2002014283 A | * | 1/2002 |
| WO | 2012066431 A1 | | 5/2012 |

OTHER PUBLICATIONS

Gross et al. "Best Location for an Asphere Inside a System," in: Handbook of Optical Systems, Wiley-VCH, vol. 3, Jan. 1, 2007, p. 444.*

Gross, Herbert et al, "Best Location for an Asphere Inside a System", in: Handbook for Optical Systems, Wiley-VCH, Weinheim, vol. 3, Jan. 1, 2007, p. 444.

* cited by examiner

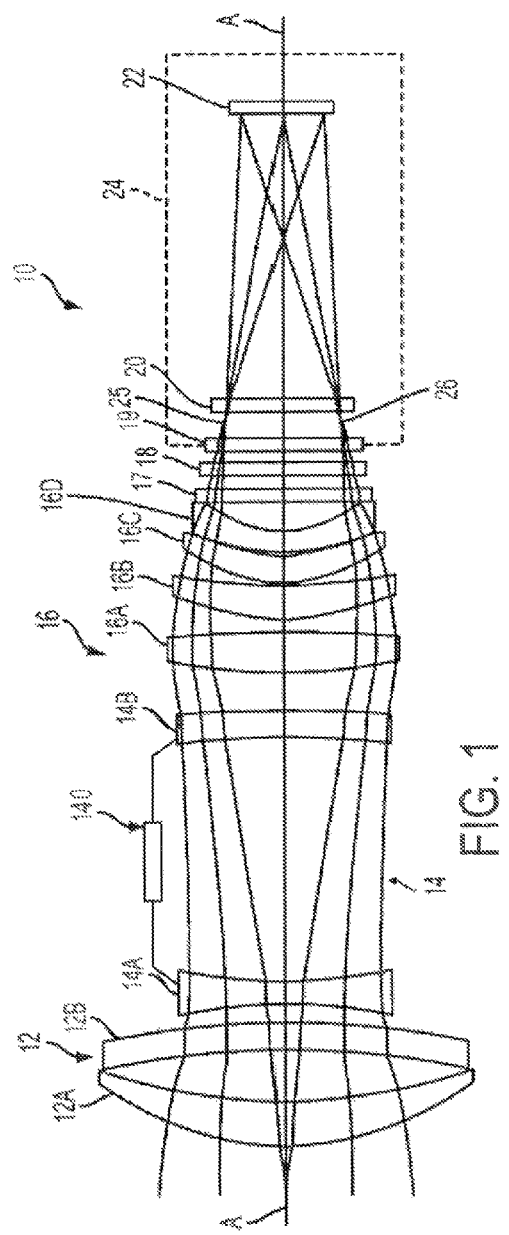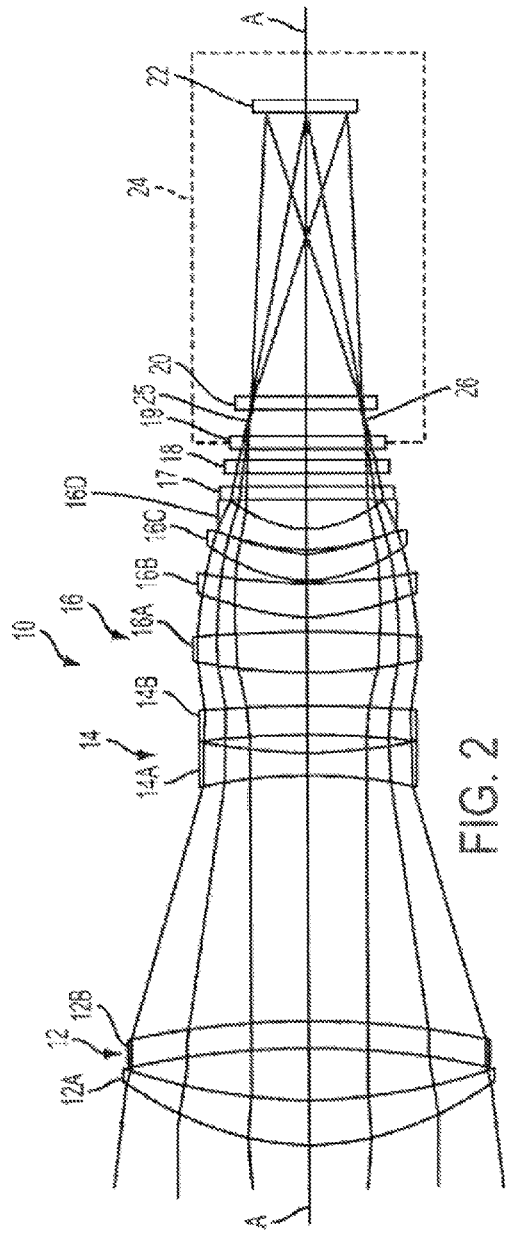

DUAL FIELD OF VIEW REFRACTIVE OPTICAL SYSTEM FOR GEO SYNCHRONOUS EARTH ORBIT

BACKGROUND

This disclosure pertains to optical imagers in general and in particular to a dual field of view refractive optical system for geosynchronous earth orbit.

Demand for imaging sensors that provide wide area surveillance is increasing. Wide area surveillance can be used in various applications such as on an unmanned aerial vehicle (UAV) platform for target recognition or on satellites such as satellites on geostationary or geosynchronous earth orbit (GEO). Wide area surveillance can be performed at various wavelength ranges depending on the desired application. The wavelength ranges of interest include short wavelength infrared radiation (SWIR) in the wavelength range between approximately 1 μm and 3 μm, mid wavelength infrared radiation (MWIR) in the wavelength range between approximately 3 μm and 5 μm, and long wavelength infrared radiation (LWIR) in the wavelength range between approximately 8 μm and 12 μm.

For example, optical systems from GEO orbits are sought for missile warning. However, current optical systems use sensors such as a starring focal plane arrays (FPA) sensors that are about 4000 by about 4000 pixels provide a ground sample distance of about 3 km which is larger than desired in certain applications or for certain functions.

Current GEO acquisition sensors operate in a scanning mode using a linear array of detectors. Starring FPA sensors that have been incorporated into scanning imagers have typically very small field of views (FOV), about 1 to 2 degrees. These scanning imagers do not provide coverage of an entire region of interest. In addition, current GEO acquisition sensors require scanning to be interrupted. Indeed, scanning sensors take a longer period of time to provide a full area coverage (e.g., full earth coverage takes about 10 seconds) due to the linear motion coupled with certain inefficiencies in the scanning operation.

Hence, there is a need in the art for optical systems with a dual field of view refractive optical system for GEO orbit that allow both viewing a broader area or region of interest while being able to zoom to a desired smaller area within the broader area for a more detailed view of the smaller area.

SUMMARY

One or more embodiments of the present disclosure provide an optical system including a first lens group having a plurality of lenses; a second lens group having a plurality of lenses, the second lens group being disposed adjacent the first lens group; a third lens group having a plurality of lenses, the third lens group being disposed adjacent the second lens group; and a detector disposed behind the third lens group. A pupil of the optical system is located external to the first lens group, the second lens group and the third lens group. The second lens group is movable respective to the first lens group and the third lens group so as to convert a configuration of the optical system between a narrow field of view (NFOV) configuration and a wide field of view (WFOV) configuration.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1 depicts an optical system in a wide field of view (WFOV) configuration, according to one embodiment;

FIG. 2 depicts the optical system in a narrow field of view (NFOV) configuration, according to one embodiment.

DETAILED DESCRIPTION

Figure 3:
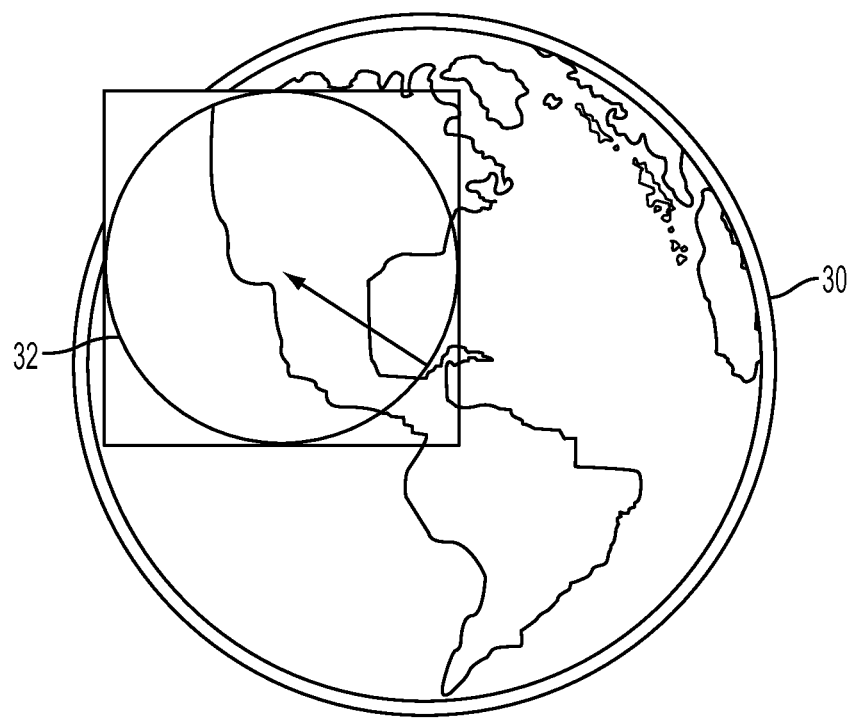
FIG. 3 shows a view of a terrestrial hemisphere imaged by the optical system depicted in FIG. 1 in the WFOV configuration and a view of a portion or area of a terrestrial hemisphere imaged by the optical system depicted in FIG. 2 in the NFOV configuration, according to one embodiment.

FIGS. 1 and 2 depict an optical imaging system providing dual field of view (FOV), according to one embodiment. FIG. 1 depicts the optical system in a wide field of view (WFOV) configuration and FIG. 2 depicts the optical system in a narrow field of view (NFOV) configuration. Typically, the WFOV configuration or mode provides a circular field of view between about 18 deg and about 20 deg., and the NFOV configuration or mode provides a circular field of view half the circular field of view of the WFOV, between about 9 deg. and about 10 deg. As shown in FIGS. 1 and 2, optical system 10 comprises first lens group 12, second lens group 14 and third lens group 16. Optical system 10 also includes aspheric corrector 17 (e.g., aspheric Schmidt type corrector) and selectable spectral filter 18 for radiation wavelength selection. Optical system 10 further includes detector or sensor 22 such as, but not limited to, a focal plane array (FPA). In one embodiment, detector 22 is disposed within Dewar 24 which serves as a cold shield within which detector 22 is cooled. Within Dewar 24 is provided spectral filter 20 for further radiation wavelength selection. Dewar 24 is provided with window 19 selected to be transparent to radiation in the desired wavelength range of operation. In one embodiment, detector 22 is selected to be sensitive in the infrared wavelength range, for example in the SWIR range and the MWIR range between about 1 μm and about 5 μm. However, detector 22 can also be selected to be sensitive in other wavelength ranges such as LWIR or any other spectral portion of the infrared range. First lens group 12, second lens group 14 and third lens group 16 capture radiation from a far field object and focus the radiation onto detector 22. In one embodiment, detector 22 can be located in the focal plane of third lens group 16.

In one embodiment, pupil 26 of optical system 10 is external to first lens group 12, second lens group 14 and third lens group 16. External pupil 26 lies between third lens group 16 and detector 22, thus external to first lens group 12, second lens group 14 and third lens group 16. In one embodiment, optical system 10 is configured such that external pupil 26 does not lie within any of first lens group 12, second lens group 14 and third lens group 16, otherwise one or more lenses of first lens group 12, second lens group 14 and/or third lens group would have to be disposed within Dewar 24. In this embodiment, cold aperture stop 25 is provided at external pupil 26. In this way, detector 22 is prevented from seeing radiation from lens or bench surfaces or from other optical components such as aspheric corrector 17, spectral filter 18 and/or window 19 that are warm (i.e., not cold shielded) and have high emissivity.

In one embodiment, first lens group 12 comprises first lens element 12A and second lens element 12B. In one embodiment, first lens element 12A has a positive power and second lens element 12B has a negative power. In one embodiment, lens element 12A and lens element 12B can be made from, for example, ZnSe and Ge, respectively. Although first lens group 12 is described above and depicted in FIG. 1 as having two lens elements, first lens group 12 can have any number of lens elements, for example, two, three, four or more lens elements. In addition, although first lens element 12A and second lens element 12B are made from the above listed material, these lens elements 12A, 12B can also be made from other optical materials which are selected depending upon the desired range of wavelengths.

In one embodiment, second lens group 14 comprises first lens element 14A and second lens element 14B. In one embodiment, first lens element 14A has a negative power and second lens element 14B has a negative power. In one embodiment, lens elements 14A, 14B can be made for example from, respectively, ZnSe and Ge. Although second lens group 14 is described above and depicted in FIGS. 1 and 2 as having two lens elements, third lens group 14 can have any number of lens elements, for example, two, three, or more lens elements. In addition, although first lens element 14A and second lens element 14B are made from the above listed material, these lens elements 14A, 14B can also be made from other optical materials which are selected depending upon the desired range of wavelengths.

In one embodiment, third lens group 16 comprises first lens element 16A, second lens element 16B, third lens element 16C, and fourth lens element 16D. In one embodiment, first lens element 16A has a positive power, second lens element 16B has a positive power, third lens element 16C has a positive power, and fourth lens element 16D has a negative power. In one embodiment, behind fourth lens 16D is provided aspheric corrector 17 to correct for spherical aberration, i.e., corrector 17 is provided between third lens group 16 and detector 22. In one embodiment, behind aspheric corrector 17 and between aspheric corrector 17 and window 19 is provided selectable wavelength filter 18. In one embodiment, lens elements 16A, 16B, 16C, 16D are made for example from, respectively, ZnSe, ZnSe, $As_2S_3$ and $BaF_2$. In one embodiment, aspheric corrector 17 is made from Ge, selectable filter 18 is made from ZnS, and window 19 and filter 20 are made from ZnS. Although third lens group 16 is described above and depicted in FIGS. 1 and 2 as having four lens elements, third lens group 16 can have any number of lens elements, for example, two, three, or more lens elements. In addition, although first lens element 16A, second lens element 16B, third lens element 16C and fourth lens element 16D are made from the above listed material, these lens elements 16A, 16B, 16C and 16D can also be made from other optical materials which are selected depending upon the desired range of wavelengths.

In one embodiment, the material from which the various lens elements in the optical system 10 are fabricated can be selected from a material transmitting in the SWIR and/or MWIR wavelength range. However, the lenses can also be fabricated from materials transmitting in the LWIR or other infrared wavelength ranges, or even in the visible range, depending on the desired application.

As shown in FIG. 1, in the wide field of view (WFOV) configuration, first lens element 14A in second lens group 14 is positioned near second lens element 12B of first lens group 12 and second lens element 14B is positioned near first lens element 16A of third lens group 16. As shown in FIG. 2, in the narrow field of view (NFOV) configuration, first lens element 14A in second lens group 14 is positioned away from first lens element 16A of first lens group 12 and near second lens element 14B. Second lens element is positioned near first lens element 16A of third lens group 16. Therefore, as it can be appreciated from FIGS. 1 and 2, when moving from a WFOV configuration into a NFOV configuration, lens 14A is moved closer to lens 14B and away from lens 12B while lens 14B is slightly moved closer to lens 16A.

In one embodiment, in order to convert the optical system 10 from the WFOV configuration into the NFOV configuration, or vice versa, a mechanism 140 is provided to move lens elements 14A and 14B within the path of radiation, i.e. within optical axis AA of optical system 10, between first lens group 12 and third lens group 16.

Optical characteristics of optical system 10 are summarized in TABLE 1. In one embodiment, detector 22 is an FPA having 4000 by 4000 pixels. However, detector 22 can also be selected with any number of pixels and with any geometry including, square, rectangular, circular, etc. In one embodiment, a size of one pixel is approximately 20 µm. However, detector 22 can be provided with a different pixel size as desired. In one embodiment, detector 22 is selected to operate in the wavelength range between about 1 µm and 5 µm. In one embodiment, the FOV achieved by optical system 10 in the WFOV configuration is approximately 18 deg. diameter. In one embodiment, the FOV achieved by optical system 10 in the NFOV configuration is approximately 9 deg. diameter. In one embodiment, the effective focal length of optical system 10 in the WFOV configuration is approximately 25.8 cm and the effective focal length of optical system 10 in the NFOV configuration is approximately 50.8 cm providing a zoom ratio (longest focal length divided by shortest focal length) of a 2:1. In one embodiment, a speed achieved by optical system 10 in the WFOV or NFOV configurations is approximately F/2. In one embodiment, an aperture of optical system 10 in the WFOV configuration is approximately 12.8 cm and in the NFOV configuration approximately 25.5 cm. In one embodiment, an instantaneous field of view (IFOV) of optical system 10 in the WFOV configuration is approximately 78 µrad and the IFOV of optical system in the NFOV configuration is approximately 39 µrad. In one embodiment, a ground sample distance (GSD) that can be viewed by optical system 10 in WFOV configuration is about 3.1 km and about 1.56 km in NFOV configuration.

TABLE 1

| PARAMETER | WFOV | NFOV |
|---|---|---|
| FPA | 4K × 4K pixels pixel size: 20 µm | 4K × 4K pixels pixel size: 20 µm |
| FOV (deg.) | 18 deg. (diagonal) | 9 deg. (diagonal) |
| IFOV (µrad) | 78 | 39 |
| Aperture (cm) | 12.8 | 25.5 |
| Effective Focal Length (cm) | 25.8 | 50.8 |
| Speed | F/2.0 | F/2.0 |
| Waveband (µm) | 1.0-5.0 | 1.0-5.0 |
| GSD (km) | 3.1 | 1.56 |

TABLE 2 lists the optical prescription parameters, according to one embodiment. Specifically, optical surfaces of optical system 10 and their respective radii of curvature (RD), aspheric coefficients (AD), (AE), (AF), and (AG), thickness (Thk), and type of material (Matl) when applicable are listed in TABLE 5. With this optical prescription, optical system 10 achieves an F-number or speed of about F/2 with a focal length of about 25.8 cm in the WFOV configuration and about 50.8 cm in the NFOV configuration, and a FOV of about 18 deg. in the WFOV configuration and a FOV of about 9 deg. in the NFOV configuration.

it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

TABLE 2

| Surf. No. | Component | Rd | CC | Ad | Ae | Af | Ag | Thk WFOV | Thk NFOV | Mat'l |
|---|---|---|---|---|---|---|---|---|---|---|
| 1 | Lens 12A | 37.3207 | | | | | | 3.250 | 3.250 | ZnSe |
| 2 | | 66.6753 | 0.0021669 | −8.312E−07 | −4.663E−10 | 9.430E−13 | 1.249E−15 | 3.8843 | 3.8843 | air |
| 3 | Lens 12B | −105.254 | | | | | | 2.000 | 2.000 | Ge |
| 4 | | −122.113 | | 3.344E−08 | −3.776E−10 | −5.908E−13 | 7.926E−16 | 1.3102 | 18.4957 | air |
| 5 | Lens 14A | −70.9075 | | | | | | 1.750 | 1.750 | ZnSe |
| 6 | | 71.2136 | | 1.255E−06 | 6.816E−09 | −3.155E−11 | 4.703E−14 | 18.0407 | 1.2114 | air |
| 7 | Lens 14B | −120.936 | | | | | | 2.000 | 2.000 | Ge |
| 8 | | −262.065 | | −7.290E−07 | −1.415E−08 | 3.255E−12 | 1.116E−13 | 2.8698 | 2.5136 | air |
| 9 | Lens 16A | 64.8955 | | 5.716E−06 | −5.868E−08 | 8.822E−11 | −1.857E−13 | 2.900 | 2.900 | ZnSe |
| 10 | | −239.660 | | | | | | 1.1206 | 1.1206 | air |
| 11 | Lens 16B | 34.9170 | | | | | | 2.350 | 2.350 | ZnSe |
| 12 | | 67.4483 | | 4.946E−07 | −1.524E−08 | −1.384E−10 | −4.272E−15 | 0.250 | 0.250 | air |
| 13 | Lens 16C | 19.8273 | | | | | | 2.000 | 2.000 | As$_2$S$_3$ |
| 14 | | 25.9546 | | 6.343E−06 | −1.037E−07 | 3.421E−10 | −4.246E−12 | 0.2075 | 0.2075 | air |
| 15 | Lens 16D | 28.0069 | | | | | | 1.500 | 1.500 | BaF$_2$ |
| 16 | | 13.4486 | | | | | | 2.2238 | 2.2238 | air |
| 17 | Corrector 17 | inf | | | | | | 0.948 | 0.948 | Ge |
| 18 | | inf | | 7.912E−06 | 5.001E−08 | −2.834E−11 | 5.510E−12 | 0.948 | 0.948 | air |
| 19 | Filter 18 | inf | | | | | | 0.948 | 0.948 | ZnS |
| 20 | | inf | | | | | | 0.948 | 0.948 | air |
| 21 | Window 19 | inf | | | | | | 0.948 | 0.948 | ZnS |
| 22 | | inf | | | | | | 0.948 | 0.948 | air |
| 23 | Stop 25 | inf | | | | | | 0.948 | 0.948 | air |
| 24 | Filter 20 | inf | | | | | | 0.948 | 0.948 | ZnS |
| 25 | | inf | | | | | | 20.9725 | 20.9725 | air |
| 26 | Focal Surf. | inf | | | | | | | | |

FIG. 3 shows a view of a terrestrial hemisphere 30 imaged by the optical system 10 in a WFOV configuration and a view of a portion or area 32 of a terrestrial hemisphere imaged by optical system 10 in a NFOV configuration, according to one embodiment. The optical system 10 is provided on GEO satellite, i.e. a satellite at a geostationary extraterrestrial orbit. The optical system 10 is directed or oriented to image earth surface. As depicted in FIG. 3, the GSD in the NFOV configuration is approximately half the GSD in the WFOV configuration. This provides zooming to an area of interest such as area 32 from larger hemisphere area 30. The result is a higher resolution zoomed image of area 32. This offers greater clutter rejection by zooming to desired region of interest. Any area 32 within larger area 30 can be imaged with optical system to capture more details about area 32. This can be accomplished by tilting and/or offsetting the optical axis AA of optical system 10 to align to an area 32 of interest within area 30. For example, a 4.5 deg. radial offset can shift the optical system 10 in the NFOV configuration to any part of the earth. The offset can be done, for example, using a flex-pivot tiltable structure or platform, or alternatively, on a platform supported by a series of struts, the length of which can be adjusted to provide a suitable offset of the optical axis.

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A non-reimaged optical system without an intermediate image plane and comprising:
    a first lens group comprising a first lens element having a positive power and a second lens element having a positive power;
    a second lens group comprising a first movable lens element having a negative power and a second movable lens element having a negative power, the second lens group being disposed adjacent the first lens group;
    a third lens group comprising a first third-group lens element having a positive power, a second third-group lens element having a positive power, a third third-group lens element having a positive power, and a fourth third-group lens element having a negative power, the third lens group being disposed adjacent the second lens group; and
    a detector disposed behind the third lens group and disposed within a cold shield for cooling the detector;
    wherein a pupil and an aperture stop of the non-reimaged optical system are located between the third lens group and the detector, external to the first lens group, the second lens group and the third lens group in combination, there being no lens groups positioned between the pupil and the detector, the pupil being disposed coincident with the cold shield and co-located with the aperture stop; and wherein the second lens group is movable respective to the first lens group and the third lens group along an optical axis extending between the first lens group and the detector so as to convert a configuration of the non-reimaged optical system between a narrow field of view (NFOV) configuration and a wide field of view (WFOV) configuration, the pupil being external to the first lens group, the second lens group, and the third lens group in both the NFOV configuration and the WFOV configuration.

2. The non-reimaged optical system of claim 1, further comprising a mechanism configured to move the second lens group along the optical axis to shift the configuration of the non-reimaged optical system between the narrow field of view (NFOV) configuration and the wide field of view (WFOV) configuration.

3. The non-reimaged optical system of claim 1, further comprising an aspheric corrector disposed between the third lens group and the pupil, the aspheric corrector being configured to correct for spherical aberration of the non-reimaged optical system.

4. The non-reimaged optical system of claim 1, further comprising a spectral filter disposed between the third lens group and the detector.

5. The non-reimaged optical system of claim 1, wherein the first lens element comprises ZnSe and the second lens element comprises Ge.

6. The non-reimaged optical system of claim 1, wherein the first movable lens element and the second movable lens element of the second lens group comprise, respectively, ZnSe and Ge.

7. The non-reimaged optical system of claim 1, wherein the first third-group lens element comprises ZnSe, the second third-group lens element comprises ZnSe, the third third-group lens element comprises As2S3, and the fourth third-group lens element comprises BaF2.

8. The non-reimaged optical system of claim 1, wherein a field of view of the non-reimaged optical system in the NFOV configuration is approximately 9 degrees.

9. The non-reimaged optical system of claim 1, wherein a field of view of the non-reimaged optical system in the WFOV configuration is approximately 18 degrees.

10. The non-reimaged optical system of claim 1, wherein in the wide field of view configuration the first movable lens element is disposed near the first lens group and the second movable lens element is disposed near the third lens group, and wherein in the narrow field of view configuration, the first movable lens element is positioned away from the first lens group and near the second movable lens element.

11. The non-reimaged optical system of claim 10, wherein when the non-reimaged optical system is converted from the wide field of view configuration into the narrow field of view configuration, the first movable lens element is moved closer to the second movable lens element and away from the first lens group while the second movable lens element is moved closer to the third lens group.

12. The non-reimaged optical system of claim 1, wherein a focal length of the non-reimaged optical system in the wide field of view configuration is approximately 25.8 cm to achieve a relatively wide field of view.

13. The non reimaged optical system of claim 1, wherein a focal length of the non-reimaged optical system in the narrow field of view configuration is approximately 50.8 cm to achieve a relatively narrow field of view.

14. The non-reimaged optical system of claim 1, wherein a speed of the non-reimaged optical system is approximately F/2.

15. The non-reimaged optical system of claim 1, wherein the non-reimaged optical system is configured to image a ground sample distance of approximately 3 km in the wide field of view configuration and image a ground sample distance of approximately 1.56 km in the narrow field of view configuration.

16. The non-reimaged optical system of claim 1, wherein the non-reimaged optical system has an aperture in the wide field of view configuration of approximately 12.8 cm and has an aperture in the narrow field of view configuration of approximately 25.5 cm.

17. The non-reimaged optical system of claim 1, wherein the non-reimaged optical system is disposed on a satellite at a geostationary extraterrestrial orbit and the system is configured to image an object in the infrared range between approximately 1 μm and 5 μm.

* * * * *